(12) United States Patent
Kocher

(10) Patent No.: US 7,616,784 B2
(45) Date of Patent: Nov. 10, 2009

(54) METHOD AND APPARATUS FOR CONTACTLESS HAND RECOGNITION

(76) Inventor: Robert William Kocher, 4828 3rd St. North, Arlington, VA (US) 22203

( * ) Notice: Subject to any disclaimer, the term of this patent is extended or adjusted under 35 U.S.C. 154(b) by 1386 days.

(21) Appl. No.: 10/206,096

(22) Filed: Jul. 29, 2002

(65) Prior Publication Data
US 2004/0017934 A1    Jan. 29, 2004

(51) Int. Cl.
*G06K 9/00* (2006.01)
(52) U.S. Cl. .................................................. 382/115
(58) Field of Classification Search ........................ None
See application file for complete search history.

(56) References Cited

U.S. PATENT DOCUMENTS

| | | | | |
|---|---|---|---|---|
| 4,720,869 | A * | 1/1988 | Wadia | 382/115 |
| 5,887,069 | A * | 3/1999 | Sakou et al. | 382/100 |
| 6,202,151 | B1 * | 3/2001 | Musgrave et al. | 713/186 |
| 6,215,890 | B1 * | 4/2001 | Matsuo et al. | 382/103 |
| 6,225,890 | B1 * | 5/2001 | Murphy | 340/426.19 |
| 6,498,970 | B2 * | 12/2002 | Colmenarez et al. | 701/36 |
| 6,901,155 | B2 * | 5/2005 | Xia et al. | 382/125 |
| 2002/0090146 | A1 * | 7/2002 | Heger et al. | 382/291 |
| 2003/0105964 | A1 * | 6/2003 | Brainard et al. | 713/178 |

OTHER PUBLICATIONS

Osamu Hasegawa, Kazuhiko Yokosawa and Mitsuru Ishizuka, "Real-Time Parallel and Cooperative Recognition of Facial Images for an Interactive Visual Human Interface" 1994, IEEE.*

* cited by examiner

*Primary Examiner*—Bhavesh M Mehta
*Assistant Examiner*—Alex Liew

(57) ABSTRACT

A method and apparatus is provided for Contactless Hand Recognition (CHR) for positive identification of cooperative individuals seeking access to physical, logical, or informational systems. Contactless Hand Recognition (CHR) is based on a novel technique and apparatus that rapidly and contactlessly captures a livescan hand geometry video image with a visible wavelength, infrared, or thermal camera of a person desiring access, then reduces the image to a template, compares the livescan template to a reference template, and determines if there is a match. Contactless Hand Recognition (CHR) is a significant advancement over current state-of-the-art hand recognition systems because authentication is done contactlessly while on the move, and at a distance, while simultaneously verifying liveness. It can also be combined with a personal knowledge process to include the use of a Personnel Identification Number (PIN), a secret contactless sign (SCS), or unique hand/finger position biometrics known only to the user. The CHR invention offers the possibility for users to have a rapid, fully contactless three-factor system of authentication based on contactless tokens, biometrics, and personal knowledge identification signs.

19 Claims, 11 Drawing Sheets

METHOD AND APPARATUS FOR CONTACTLESS HAND RECOGNITION

FEDERALLY SPONSORED RESEARCH

Not Applicable

REFERENCE TO A MICROFICHE APPENDIX

Not Applicable

BACKGROUND

1. Field of the Invention

This invention relates to the positive identification of an individual based on hand geometry, thermal signature, hand orientation, hand position, and/or finger configuration. Contactless Hand Recognition (CHR) can be combined with a contact or contactless token to allow for three factors of authentication: (1) physical identification token, (2) the biometric signature, which can be a video contactless hand geometry, or thermal signature derived from a hand, and (3) a unique position of the hand and fingers known only to the individual.

2. Description of Prior Art

Today's hand recognition systems typically require an individual to insert his hand into a box-type device positioning the hand and each finger between fixed pins on its bottom surface. The band recognition system requires all individuals to make contact or touch a platform. Current state-of-the-art models have several disadvantages: (1) sanitary considerations are associated with an intrusive, contact hand reader: many users express concern and dissatisfaction with current invasive contact systems which require many people to touch the same surface. Germs and other substances can be passed from one person to the next through contacting the same surface. (2) hand recognition with these readers cannot be done quickly, while moving, or from a distance: the user seeking access has to stop his forward motion, place his hand inside a hand reader box, wait for recognition, and then remove his hand before proceeding. (3) susceptibility to spoofing is also a factor since there is typically no liveness testing: imitation hands will pass as well as the user's real hand, or worse yet, the user's hand will pass if not alive.

Current systems use an image acquisition system that comprises a light source, a camera, a single mirror and a flat surface. The user places his right hand, palm facing down, on the flat surface of the device. The five pegs serve as control points for an appropriate placement of the hand of the user. The device also has knobs for the system administrator to change the intensity of the light source and the focal length of the camera. The lone mirror projects the side view of the user's hand onto the camera. The image is captured and features are extracted. Feature extraction involves computing the widths and lengths of the fingers at various locations using the captured image. A template is created and compared to a reference template to determine a match.

Since general hand geometry is not as unique as fingerprints, this biometric approach is typically used to authenticate the identity of an individual rather than identify an individual. Authentication is the one-to-one identity match. One-to-one authentication systems typically require a queuing process to bring up the individual file. A one-to-one identity match example is confirming a person is Joe Smith by retrieving his file containing biometrics information such as hand geometry information and this is compared to the individual claiming to be Joe Smith. Identification, conversely, is a one-to-many match. A one-to-many match example is when a hand geometry live image is compared to the geometry of all biometric files to determine a match. Since biometrics focus on varying images and near-fit matches, one-to-many searches have a greater chance for misidentifying a cooperative user than a one-to-one authentication system.

SUMMARY OF THE INVENTION

A method and apparatus is provided for Contactless Hand Recognition (CHR) for positive identification of cooperative individuals seeking access to physical, logical, or informational systems. Contactless Hand Recognition (CHR) is based on a novel technique and apparatus that rapidly and contactlessly captures a livescan hand geometry video image with a visible wavelength, infrared, or thermal camera of a person desiring access, then reduces the image to a template, compares the livescan template to a reference template, and determines if there is a match. Contactless Hand Recognition (CHR) is a significant advancement over current state-of-the-art hand recognition systems because authentication can be done contactlessly while on the move, and at a distance, in a vehicle or walking and can simultaneously verifying liveness. It can also be combined with a personal knowledge process to provide a Personnel Identification Number (PIN) like secret contactless sign, such as unique hand/finger position biometrics known only to the user. These unique orientation signs can also be used to communicate various meaning to the system such as 'all is normal' or a 'distress' states. The CHR invention offers the possibility for users to have a rapid, fully contactless three-factor system of authentication based on contactless tokens, biometrics, and personal knowledge identification signs.

CHR can also be combined with biometric facial recognition systems to enhance biometric authentication or use facial recognition systems to develop an identification short list that can be compared to the contactless hand geometry identification short list.

CHR method and apparatus provides the means by which one can positively identify, authenticate, and authorize users, walking or driving, through pedestrian or vehicle checkpoints without stopping. Essentially, the person holds up his hand, the Contactless Hand Recognition (CHR) system authenticates the information provided by contactless sensors and compares with referenced files and determines if the individual is authorized, if so, the individual is automatically allowed to pass.

LIST OF REFERENCE NUMERALS

Figure 1:
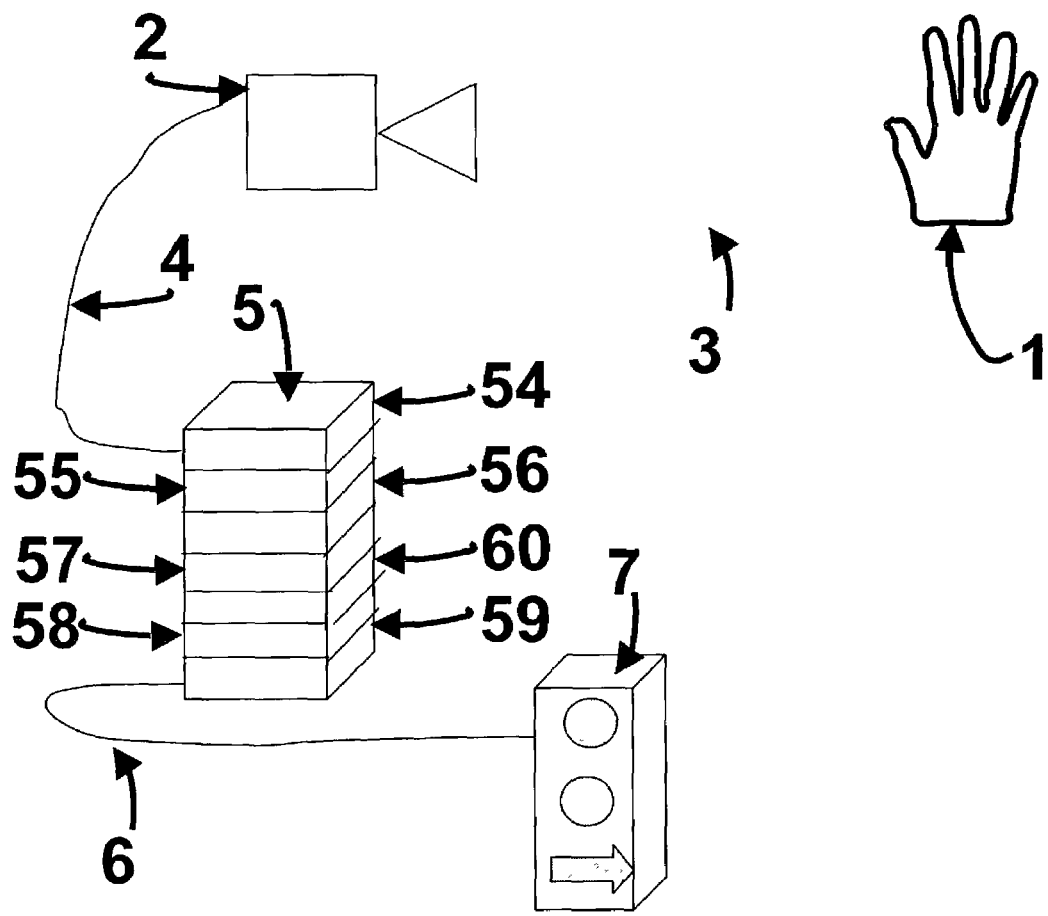
FIG. 1 is a diagram of the basic contactless hand matching system components.

Item 1=users' hand
Item 2=video camera
Item 3=video camera field of view
Item 4=communication link
Item 5=computer-processing unit containing video processing units, biometric databases, individual files, authorizations, minutiae generators, template generators, template match systems, and out put units
Item 6=communication link
Item 7=output unit
Item 8=contactless token
Item 9=base transmission/receiver unit that communicates with the contactless token
Item 10=token to receiver communication link
Item 11=transmitter to token communication link
Item 12=communication link to computer-processing unit
Item 13=secret sign
Item 14=user face
Item 15=hand image
Item 16=minutiae points
Item 17=distances between minutiae points
Item 18=user hand
Item 19=secret sign with finger folded inward
Item 20=secret sign hand
Item 21=secret sign variation
Item 22=step: user presents hand for identification
Item 23=step: video sensor captures image
Item 24=step: process image to isolate hand
Item 25=step: reduce hand image to template
Item 26=step: compare template to stored templates
Item 27=step: determine matches
Item 28=step: indicate no match
Item 29=step: indicate match
Item 30=step: contactless token enters range
Item 31=step: contactless communication of identification number
Item 32=step: look up record and determine if valid
Item 33=step: indicate token not valid
Item 35=step: indicate valid and read file's stored hand template
Item 36=step: request user to provide secret sign
Item 37=step: user presents secret sign
Item 38=step: video sensor captures image
Item 39=step: process image of secret sign
Item 40=step: reduce secret sign image to template
Item 41=step: compare template to stored templates
Item 42=step: determine if match
Item 43=step: indicate no match
Item 44=step: indicate match
Item 45=step: group individual name matches
Item 46=step: compare names in groups to look for common match
Item 47=step: indicate common match and identity
Item 48=step: user presents face for identification
Item 49=step: video sensor captures image
Item 50=step: process image to isolate face
Item 51=step: reduce face image to template
Item 52=step: compare template to stored templates
Item 53=step: determine matches
Item 54=software module that isolates the hand image from the video image
Item 55=minutiae generator module to process hand image into minutiae data
Item 56=software module that develops a mathematical relationship between minutiae points called the biometric template
Item 57=database of individual records containing and individuals' biometric templates taken at enrollment
Item 58=biometric template match system
Item 59=output processing unit that provides the results of the biometric template match system
Item 60=the livescan biometric template

DETAILED DESCRIPTION OF THE INVENTION AND PREFERRED EMBODIMENTS

The present invention is directed generally to a method and apparatus for contactlessly identifying and/or authenticating and individual's identity based on a video image of the person's hand presented cooperatively and at a distance.

A method according to one embodiment of the present invention is illustrated. An individual approaches the video camera and presents his hand in a position perpendicular to the camera so that the entire hand, palm, and fingers are presented in a spread fashion. The video camera captures the image, and then through video processing, determines selected minutiae points. Video processing involves identifying the hand shape, removing background clutter, isolating the hand shape, noting any other visible features such as skin creases, lines, joints, etc. Minutiae points are then assigned based on a hand model to reduce the image to a series of minutiae points. These minutiae points can be the fingertips, knuckles, points where the fingers join the palm, and other identifiable points on the hand. Once these minutiae points have been identified, distances between points are calculated and a ratio is then calculated to discount distance factors between the hand and the video camera. An example may be that the presented hand has an index finger that is five times long as wide and this finger is 1.2 times longer than the little finger. Distance calculations are made and a minutiae-based template is constructed. During the enrollment process, the individual's template is constructed and then stored in a database as a reference template along with the person's identity. During the requesting access process, the individual's livescan is taken, reduced to a template, and compared with the referenced template. The comparison process is a mathematical procedure used to calculate the degree of fit between the two templates. Based on minutiae points' location, all physical characteristics of the hand are compared in the two templates. A present matching value determines the match or non-match outcome. An example is a 90% overall template match is considered a positive match. Since there are numerous environmental factors, hand positioning, movement, angles, and other factors, a 100% match is unlikely. Once the results of a match are determined, an output signal is sent setting forth the results.

Referring to FIG. 1, a users hand 1 is presented to a video camera 2 within the video camera's field of view 3. The video camera 2 converts the hand image to an electronic image and transmits the image over a communication link 4 to a computer-processing unit 5. Within the computer-processing unit 5 a software module isolates the hand image from the video image 54, then a minutiae generator 55 module processes the hand image into minutiae data. This minutiae data is then input into a biometric template generator software module 56 that develops a mathematical relationship between minutiae points called the livescan biometric template 60. The livescan biometric template 60 is then compared against a database of individual records containing biometrics templates 57 taken at enrollment. A biometric template match system 58 is used to determine the percent of match of the livescan biometric template 60 to the database biometric template 57. Typically, the system administrator sets the degree-of-match. For example a 95% or better match is considered a match; anything less would be a non match. The results of the biometric template match system 58 are transmitted to the output-processing unit 59. The output-processing unit 59 inputs through a communication link 6 to display the match results a visual output display 7.

Figure 2:
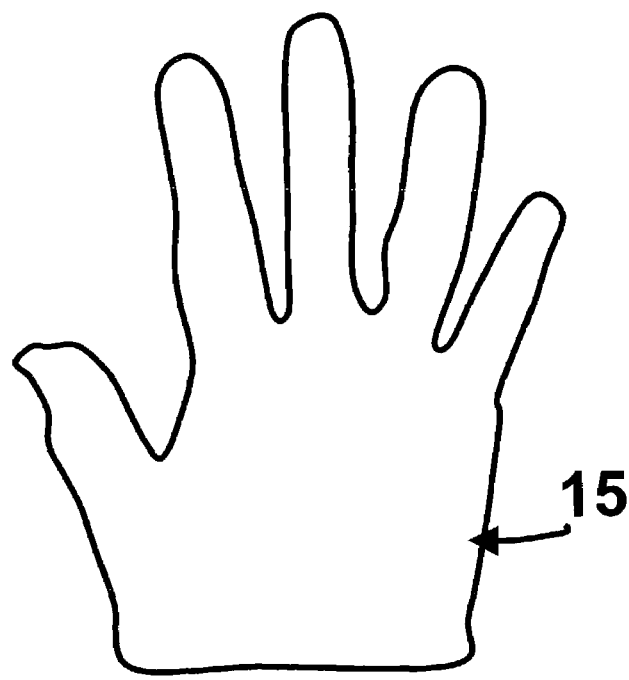
FIG. 2 is an image of a hand.

Referring to FIG. 2, the isolated hand image 15 is developed after the individual presents his hand 1 perpendicular to the video camera 2 (see FIG. 1) and the image isolation module 54 processes the image. The isolated hand image 15 is provided to the minutiae generator 55.

Figure 3:
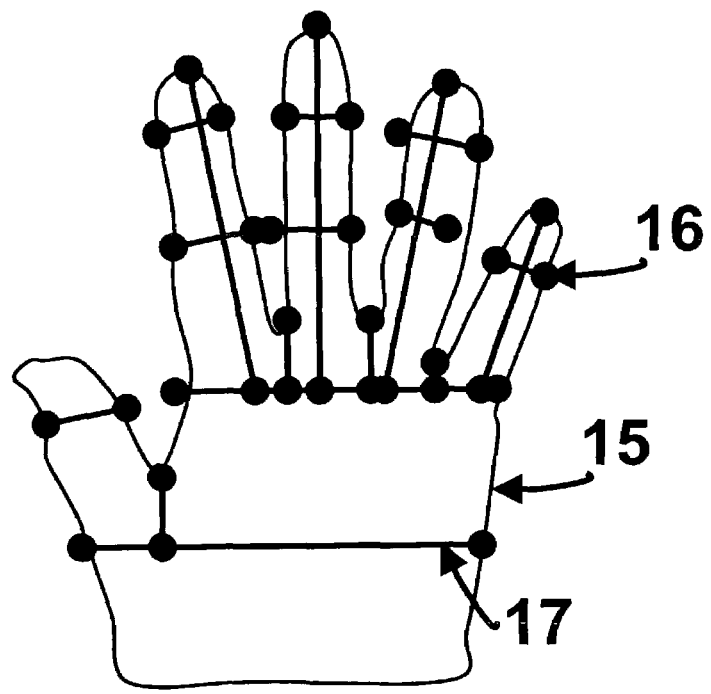
FIG. 3 shows minutiae points calculated from the hand image.

Referring to FIG. 3, the isolated hand image 15 is processed through the minutiae generator 55 and determines the location and characteristics of each minutiae point 16. The biometrics template generator 56 compares the location, characteristic, ratios, and relationship 17 of each minutiae point 16 then computes a biometric template 57 based on the livescan image 15.

Figure 4:
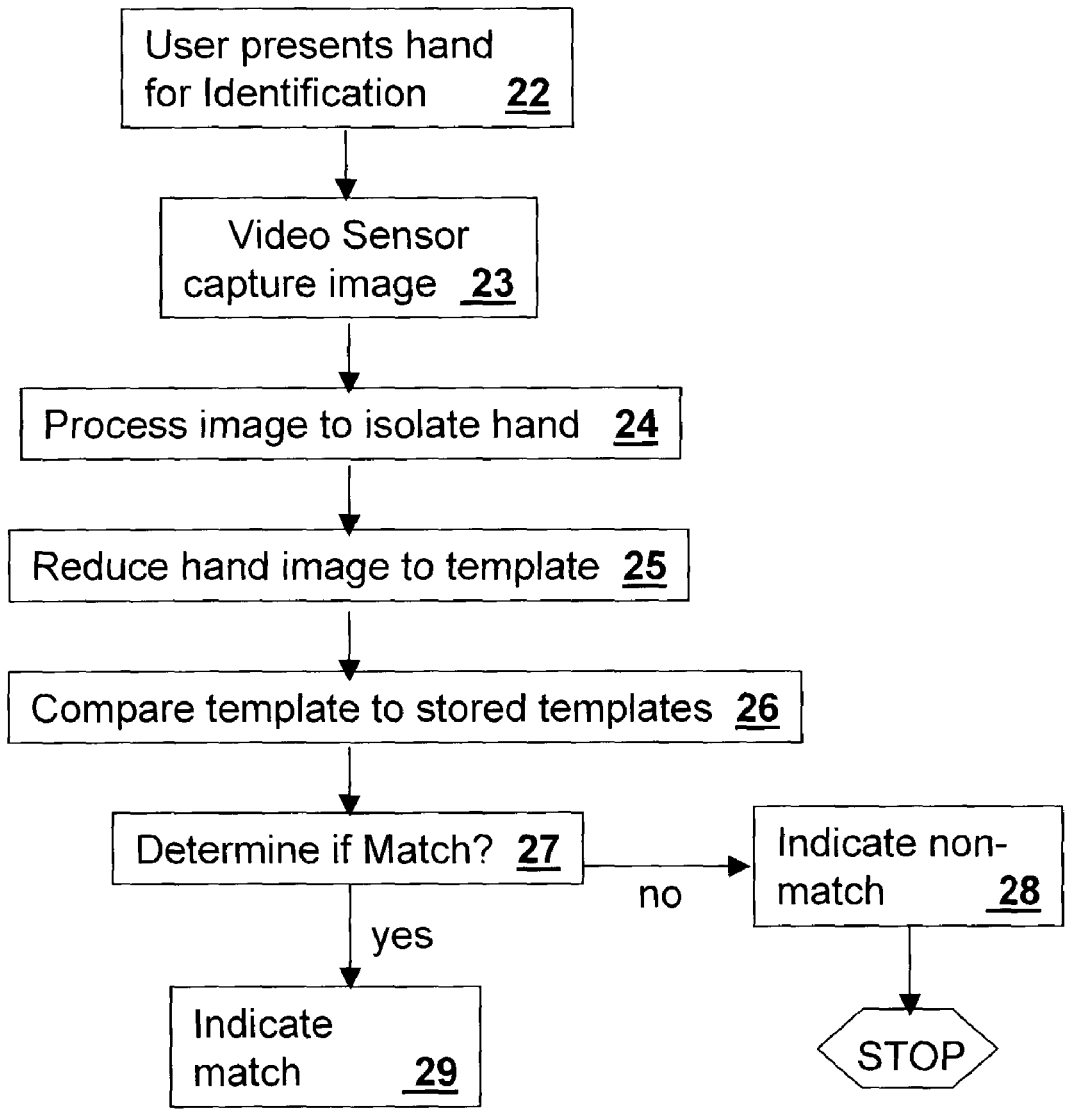
FIG. 4 shows a basic method for contactless hand matching.

Referring to FIG. 4, the method for contactless hand identification is depicted by each step. In step 22 the user present a hand for identification. The video sensor captures the image 23 and the image is processed to isolate the hand image 24. The isolated hand image is processed and minutiae points are calculated then reduced to a livescan biometric template 25. The livescan biometric template is compared to stored biometric template(s) 26. The template comparison between the livescan template to the stored template results in a mathematical value as to the degree of match. The degree of match is compared to a preset value defining the line between a match and non-match 27. An example is typically that the templates must have match value equal to or above 90% to accept the livescan as a match and conclude that the livescan is identified or authenticated 29. A value less then 90% would be considered a non-match 28.

Figure 5:
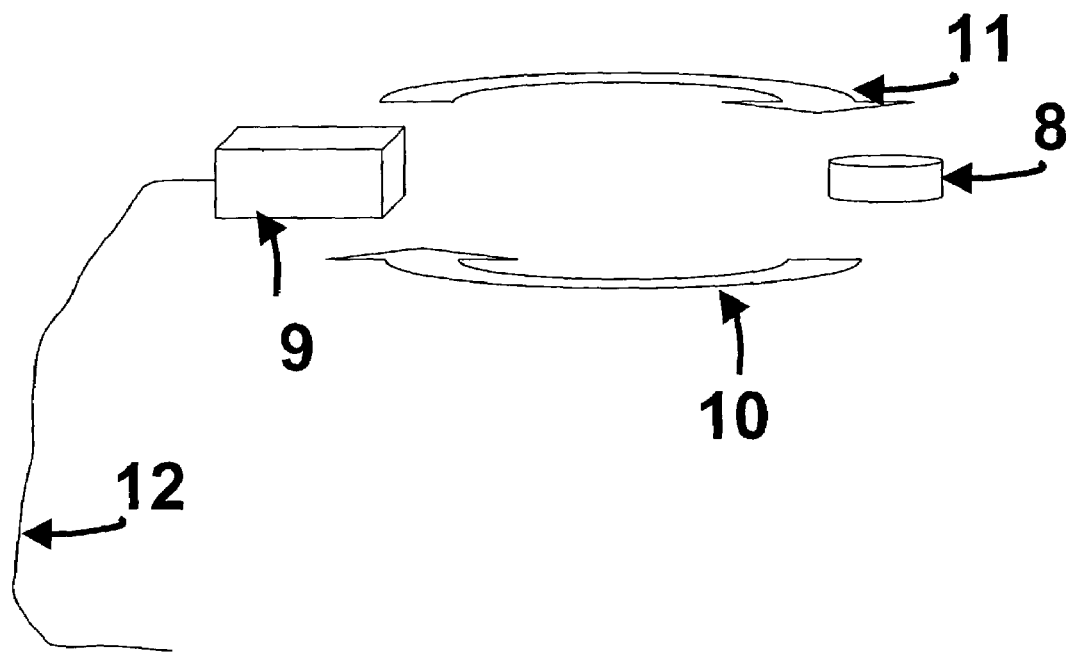
FIG. 5 is a diagram of the basic contactless token system components.

Referring to FIG. 5, a contactless token 8 is used for identification purposes, which can serve as the initial step in the authentication process. Contactless tokens 8 can be radio frequency identification devices (commonly referred to as RFID) barcodes, proximity transmitters, or contactless tags. In each case, the base transmitter/receiver unit 9 must operate with the same technology and communications frequency. As an individual approaches an access point, the contactless token 8 communicates with the base transmitter/receiver unit 9. The communication process involves the base transmitter/receiver unit 9 transmitting a call signal 11 to sense if a contactless token has entered the communication range. If the contactless token 8 is within transmission range and is queued by the base transmitter signal 11, the contactless token 8 emits a unique identification signal 10 to the base receiver 9. The base transmitter/receiver captures the contactless token's unique identification number and communicates the number through a communication link 12 to the CHR computer-processing unit 5 shown in FIG. 1.

Figure 6:
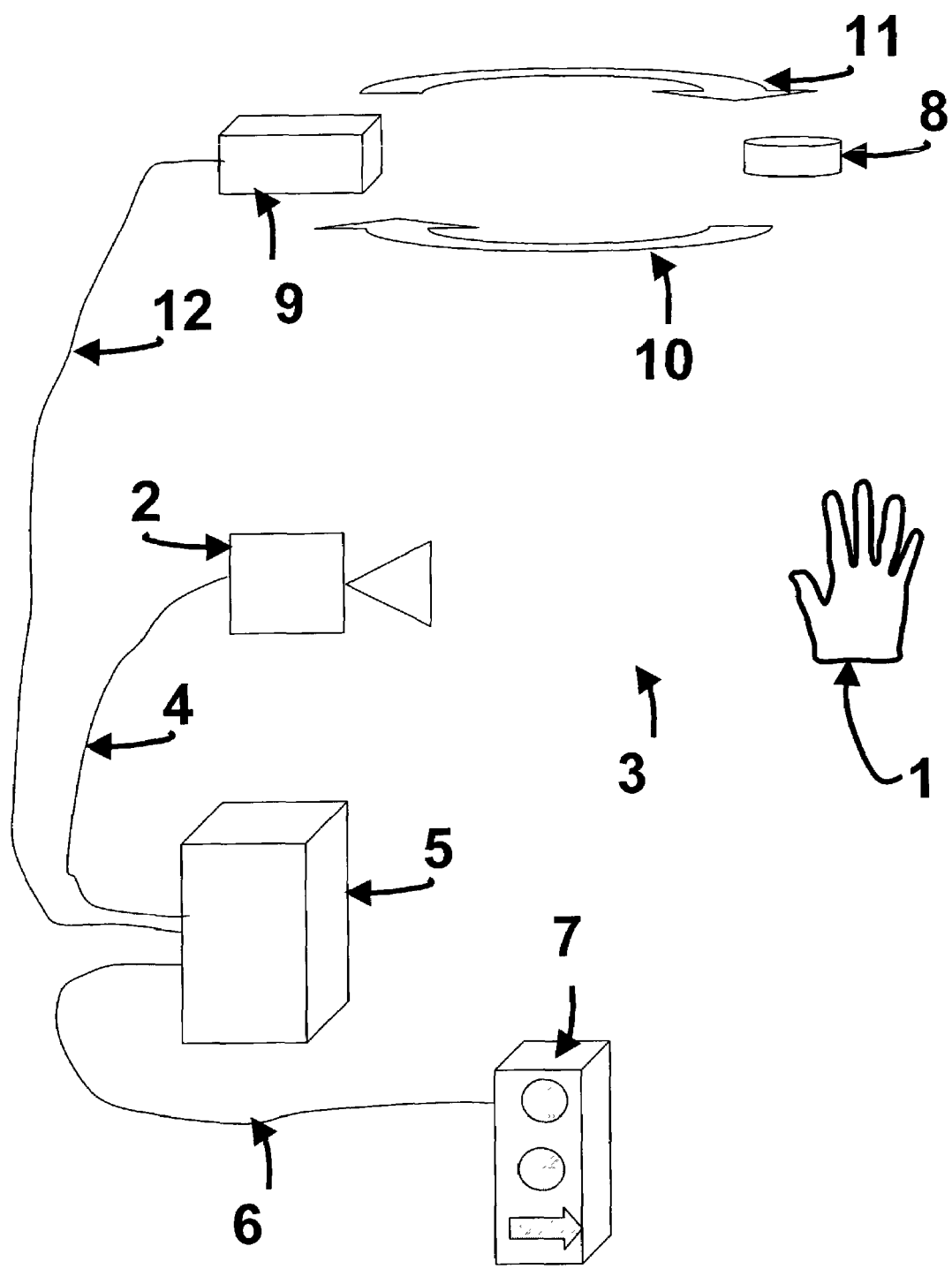
FIG. 6 is a diagram showing the combined components for the basic contactless hand matching system with the contactless token system.

Referring to FIG. 6, the contactless token system of FIG. 5 is added to the contactless hand recognition system of FIG. 1. This combined system allows for the user contactlessly identify himself using the contactless token 8 and then use the contactless hand recognition system to authenticate the individual. This apparatus allows for a one-to-one matching of biometric identity, which is inherently more secure than one-to-many biometric matching.

Figure 7:
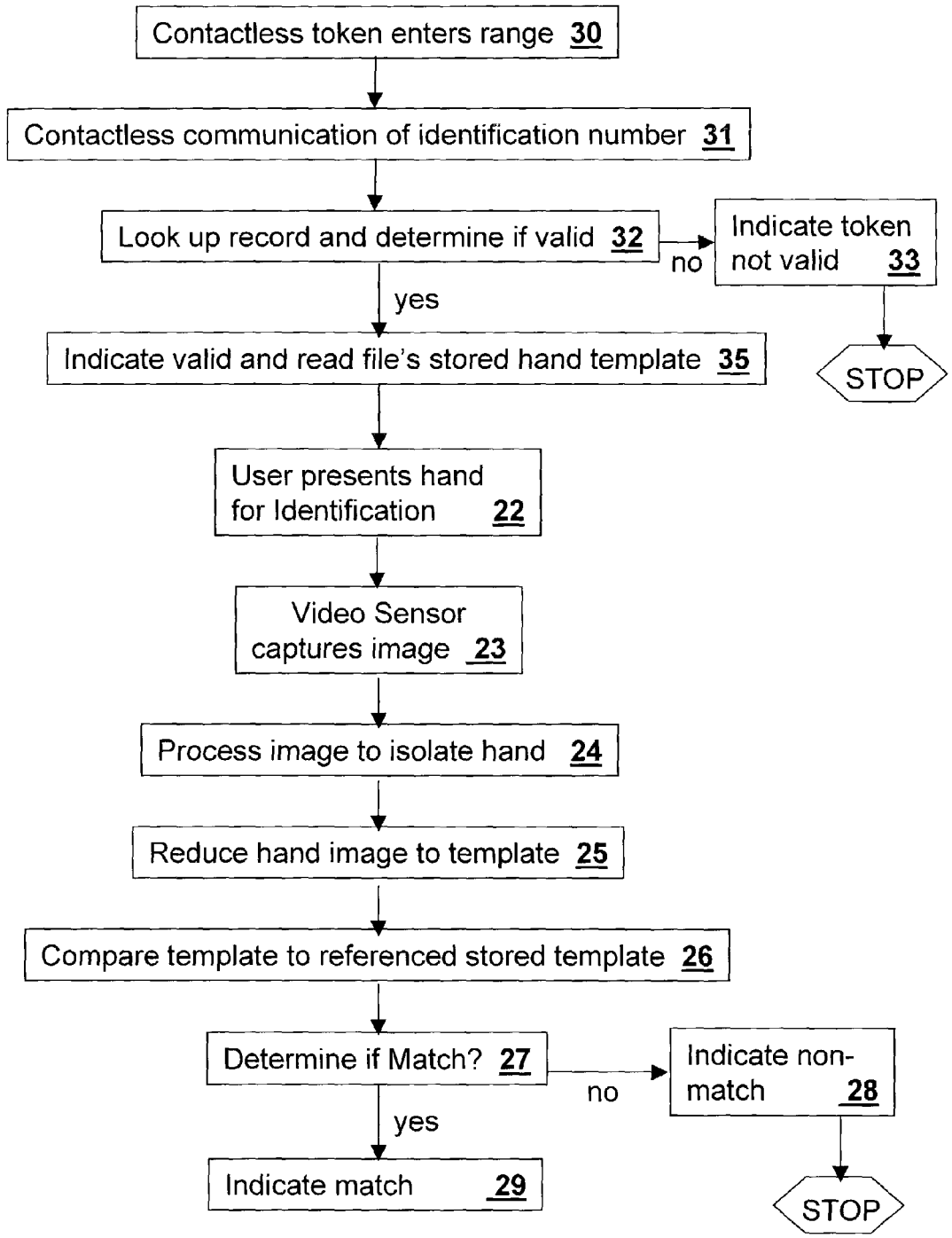
FIG. 7 is a method for combining contactless token and contactless hand matching system.

FIG. 7 depicts the method for combining a contactless token for identification and a contactless biometrics for authentication. Step 30 is begins with a contactless token entering the communication range of the base contactless token receiver/transmitter. In step 31, the base receiver/transmitter queries the contactless token and the contactless token transmits its unique identification number to the base receiver/transmitter. The computer-processing unit (CPU) brings up the file associated with the contactless token identification number and determines if the identification number is valid 32. If the identification number is not recognized, expired, or not valid, the CPU will indicate the token is not valid 33. If the token is determined to be valid 32, the file's biometric template is retrieved 35. The person requesting access is requested to present his hand for authentication. The video sensor captures the biometric hand image 23. The video image is processed to isolate the hand image 24 and then the image is processed into a livescan biometric template 25. The biometric template is then compared to the stored template brought up from an identified file 26 and a match score is compiled. If the match score does not exceed the matching threshold value, an indication is made of a non-match with the record template 28. If the matching score exceeds the matching threshold value, a match is indicated 29.

Figure 8:
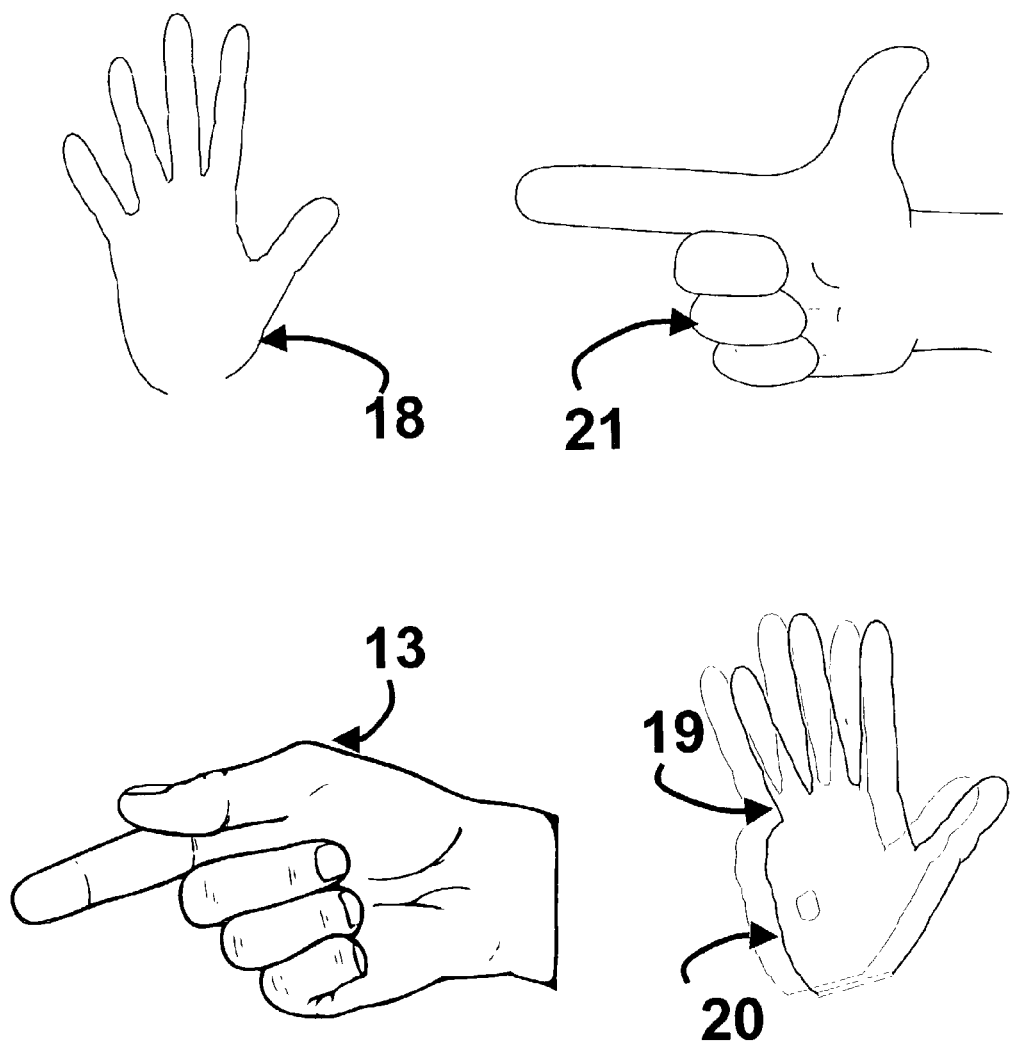
FIG. 8 shows different hand configurations that can be used for a secret sign.

Referring to FIG. 8, various hand configurations are depicted that can be used to form a secret sign or unique hand orientation. The unique hand orientation or secret sign function is similar to the common personal identification number (PIN) with the exception that the secret sign cannot be written down, easily stolen or hacked. The secret sign is selected by the individual as a unique authentication factor to add to the previously discussed factors of authentication—the contactless token and the contactless biometric. The basic hand recognition position 18 is used to identify or authenticate the individual. Once the individual passes the biometric match, the secret sign can be added to the process to further enhance authentication. Alternate secret sign configurations are shown in FIG. 8 such as extending the index finger and thumb 21 or closing one finger such as the little finger 19 to form a hand secret sign 20. A natural one finger extended 13 is also a possible secret sign. There are numerous hand/finger configurations along with numerous orientations of each configuration. The secret sign or unique hand orientation can be used to communicate special messages to the system. For example the basic access sign selected by the individual is used for normal conditions/normal access. A different configuration may indicate that the user is under duress and is being forced to provide access. This unique sign would be transmitted to the system with only the user knowing that a distress signal has been sent.

Figure 9:
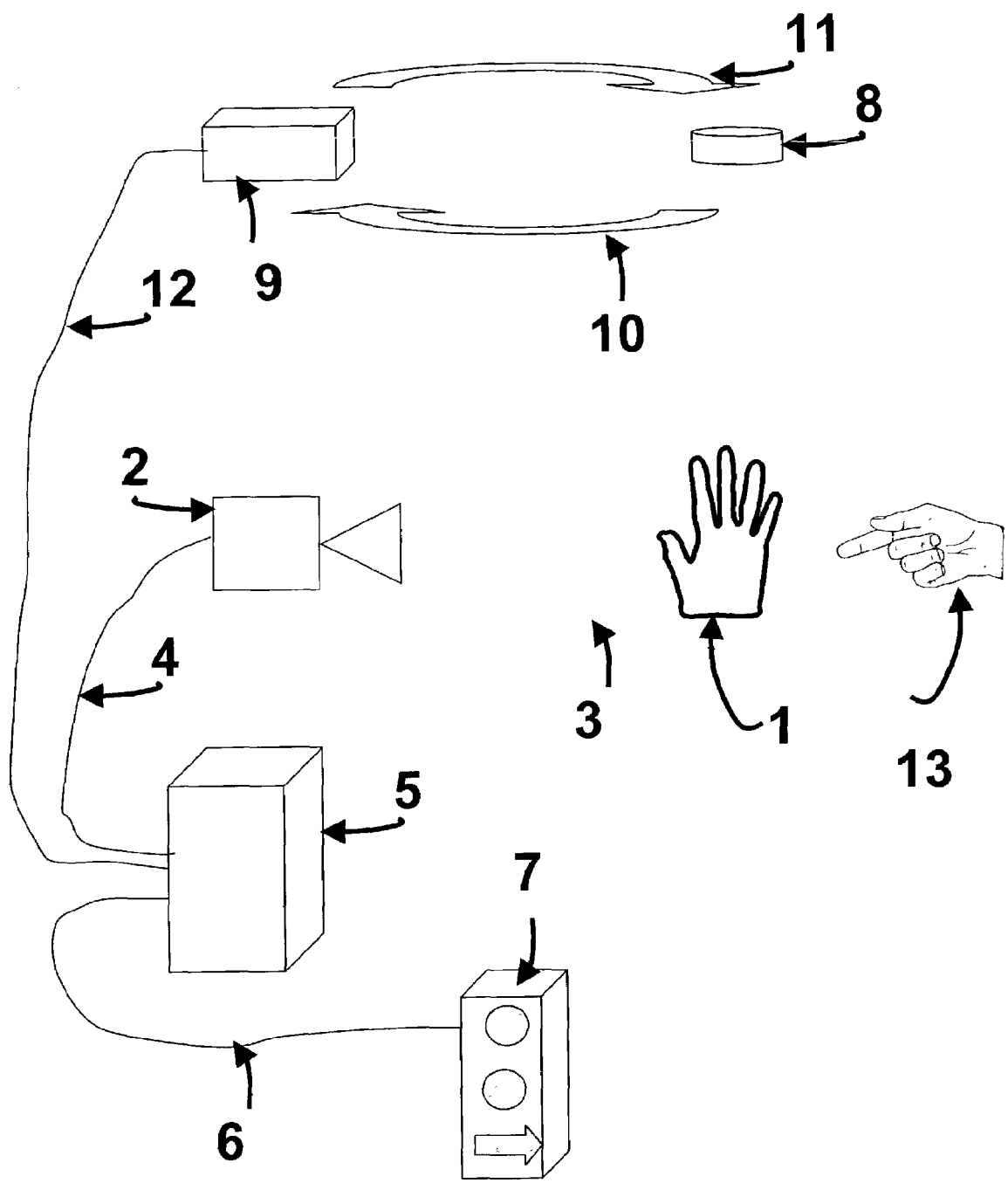
FIG. 9 shows the components of a contactless hand matching and contactless token system combined with a secret sign.

Referring to FIG. 9, components of a contactless hand matching and contactless token system are combined with a secret sign 13. The user presents his hand 1 to the video camera 2, which is transmitted over the communication link 4 to the computer-processing unit 5 for processing and authentication of the individual. Once a biometric match is determined, the secret sign 13 is requested. The same video camera 2 or a different sensor can read the secret sign 13. The video camera 2 or a similar sensor is connected to the computer-processing unit 5 which transforms the secret sign 13 into a minutiae template and compares the secret sign presented by the individual to the secret sign on record. If the system has multiple secret signs, each displaying different meanings, then the computer-processing unit 5 would recognize which secret sign was presented and respond with the corresponding logic. An example would be that each user is allowed to have a second secret sign that would covertly signal that the user is under duress and that help is quietly needed.

Figure 10:
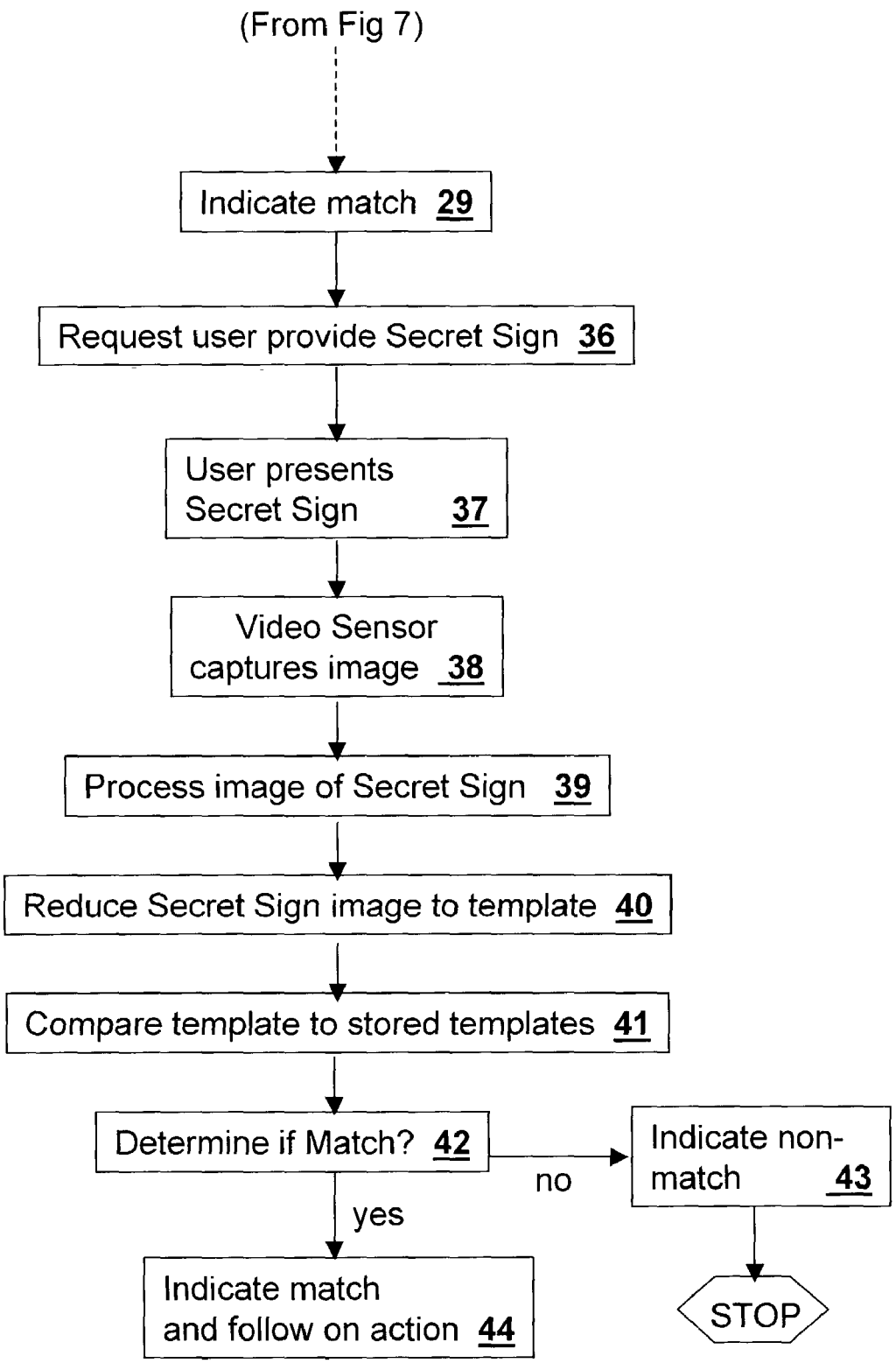
FIG. 10 expands the method for contactless hand recognition and contactless token with the addition of secret signs.

FIG. 10 depicts the method for combining a contactless token for identification, a contactless biometrics for authentication, and a contactless secret sign to further authenticate the user. Step 29 is preceded with the method described in FIG. 7 for using contactless tokens with the contactless hand matching system. Step 29 indicates that a biometric match was made as the last step in FIG. 7. Step 36 requests the user provide his secret sign. The user presents the secret sign 37 and the video sensor captures the image 38. The secret sign image is processed 39 and reduced to a template 40. The computer-processing unit compares 41 the livescan secret sign image with the image(s) on record in the computer-processing unit. If a match is made, the system will indicate a match 44. If no match is made with the secret sign, a non-match indication is made and the individual attempting access will have to meet with a guard for further processing. The secret sign or unique hand orientation can be used to communicate special messages to the system. For example the basic access sign selected by the individual is used for normal conditions/normal access. A different configuration may indicate that the user is under duress and is being forced to provide access. This unique sign would be transmitted to the system with only the user knowing that a distress signal has been sent.

Figure 11:
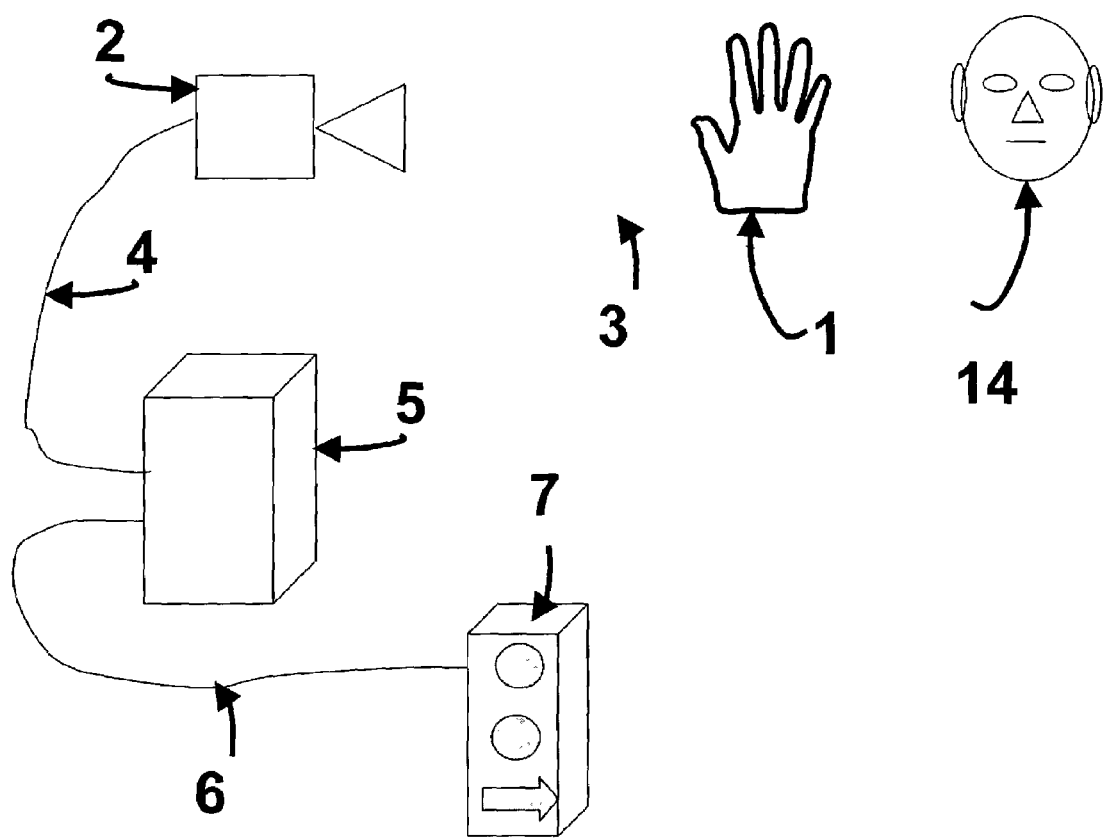
FIG. 11 shows the components for a contactless hand identification system combined with a face recognition system.

Referring to FIG. 11, a facial recognition system is added to the process. This configuration can be used without a contactless tag whereby the hand image 1 is used for identification and a facial recognition system is also used for identification. The hand image 1 is presented, the image is captured by the video camera 2, and then it is provided to the computer-processing unit to conduct a one-to-many matching search of the templates on record in the computer-processing unit 5. A short list of hand matches is recorded. The user provides his face 14 as the next biometric for identification. The facial identification system components process in a similar manner as the hand identification system components. A facial biometric template is created and compared on a one-to-one basis with the templates on file, and then a short list is developed of those with the closest match. The short list developed from the hand identification hardware/software and the short list developed from the facial identification hardware/software are compared to select the individual that is on both lists.

Figure 12:
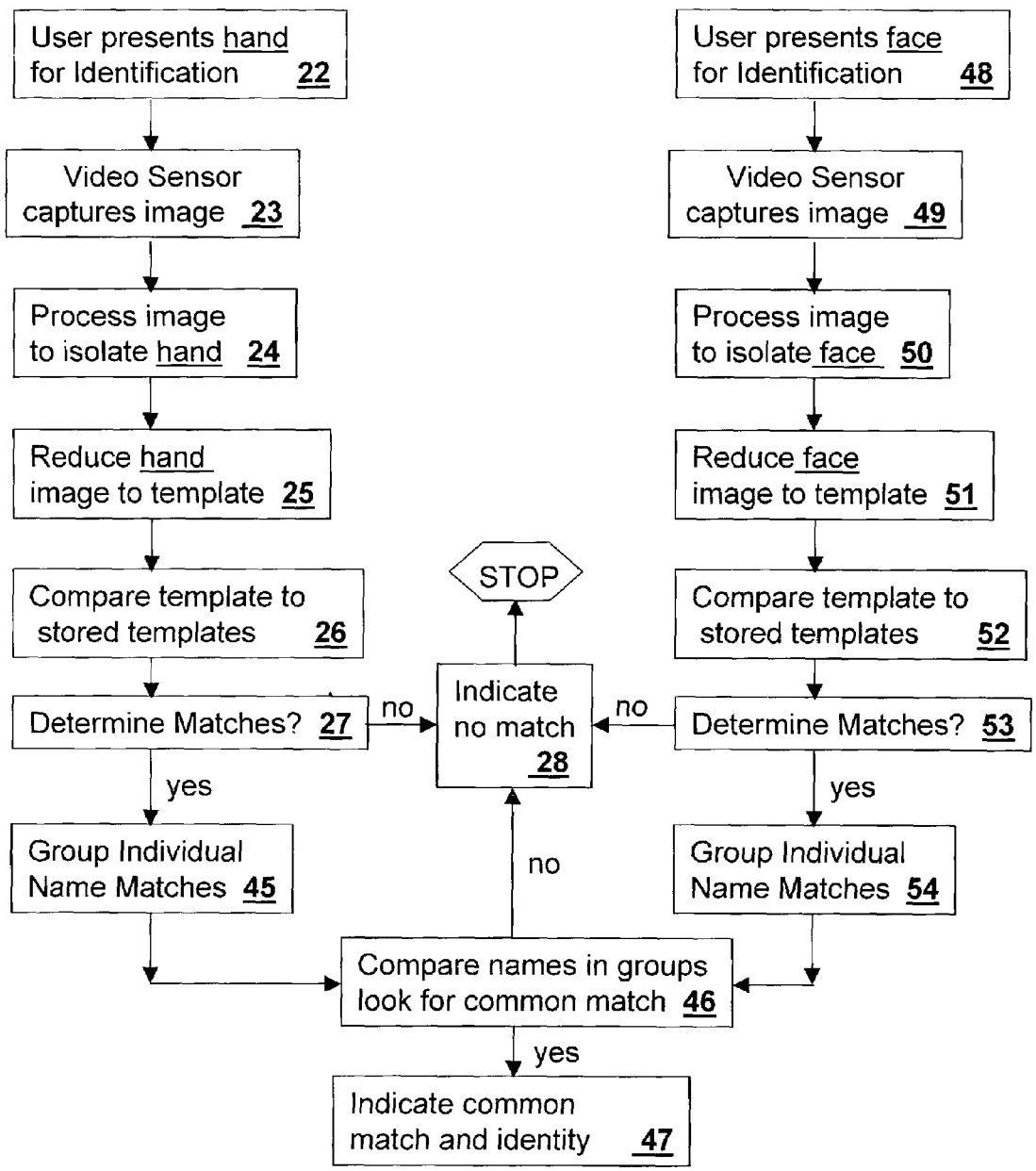
FIG. 12 is a method for combining a contactless hand identification system with a contactless facial recognition system.

FIG. 12 depicts the method for combining a contactless hand recognition identification system and a facial identification recognition system, to use the results from both to determine the individual's identity. Step 22 begins with the user presenting his hand to the video sensor. The video sensor 23 captures the image and processes it to isolate the hand 24 image. The hand image is reduced to a template 25 and the template is compared to stored templates 26. Step 27 determines if there are matches. If there are no matches 28, an indication is made and the process is stopped. If there are matches in the one-to-many process, a short list is developed 45. Once a hand geometry short list has been established, the user is requested to present his face for identification 48. The video sensor captures the face image 49 and processes the image to isolate the face 50. The face is reduced to a template 51 and this template is compared with face templates stored in the computer-processing unit. If no matches are found, an indication is made 28 and the process is stopped. If matches are found, a short list is developed 54. The hand image identification short list and the facial image identification short list are compared to find a common match and identity. If there is only one unique individual found, a match is indicated 47 and access is granted. If no matches or multiple matches are found on both lists, then no access is granted.

Implementing the facial recognition steps prior to the hand identification steps can modify this method. Additional embodiments can include using the facial recognition to queue the hand recognition files to reduce the number of one-to-many files that must be examined. The same is true if hand identification is used to pull up only the match files and only the facial recognition templates of those files.

In another embodiment of the present invention, an infrared or thermal camera is used to capture the hand geometry image. The thermal image provides details and a distinct thermal hand shape. This highly distinguishable template makes system spoofing or deception very difficult. The thermal image also identifies a true, live hand. Paper cutouts or photographs will not produce similar unique video images. Thermal cameras are very good in low level light conditions, inclement weather, and at extended ranges. The current embodiment can be deployed within a range of 3 to 20 feet, which is an excellent range for thermal cameras to produce a high degree of contrast and definition.

While my above description contains many specificities, these should not be construed as limitations on the scope of the invention, but rather as an exemplification of one of the preferred embodiments. Many other variations are possible for buildings, controlled areas, rooms, or information access systems. Any system whose security could be enhanced through contactless token and contact or contactless biometrics would greatly benefit from this three-factor approach. Accordingly, the scope of the invention should be determined not by the embodiments illustrated, but by the appended claims and their legal equivalents.

What is claimed is:

1. A contactless hand recognition system for identifying an individual, comprising:

an imaging device producing an image signal of a person's hand;

a computer-processing unit;

an image processing unit contained in said computer-processing unit, connected to said imaging device for receiving said image of a person's hand based on measurable biometrics characteristics of said hand with the image comprising at least one of: (i) finger dimensions, (ii) palm dimensions, (iii) location of visible features on hand, (iv) location of thermal features of the hand, and (v) entire hand;

a software program within said image processing unit that extracts said persons hand image from said imaging device;

a minutia generator that processes said extracted hand image to generate minutia points;

a software program to convert the minutia to a biometric template using a mathematical relationship between said minutia points;

a database of individual records containing biometric templates;

a biometric template match system that compares and computes a percentage of match between said video image biometric template and said biometric template from said database;

an output signal which is produced when said match percentage exceeds a set threshold or a different output signal when said match does not exceed said set threshold;

a token that presents a unique identification number wherein said token's communication media comprises at least one of: (i) radio frequency, (ii) laser, (iii) light, (iv) infrared, (v) acoustics, and (vi) mechanical contact;

a transmitter/receiver for said token communication signal;

a database to link said token to an individual's record containing a biometric template;

a software-processing program to verify said token as valid; and the hand recognition system further comprising said person's hand in a unique hand position, wherein said unique hand position matching results in multiple unique verifications with different meanings.

2. The system as defined in claim 1, wherein said physical token is a contactless token.

3. The system as defined in claim 1, used in conjunction with a facial recognition system.

4. The system as defined in claim 1, wherein said imaging device is an infrared camera.

5. The system as defined in claim 1, wherein said database includes access authorization information.

6. A system for authenticating an individual through a unique hand position, comprising:

a physical token that presents a unique identification number wherein said token's conmiunication media comprises at least one of: (i) radio frequency, (ii) laser, (iii) light, (iv) infrared, (v) acoustics, and (vi) mechanical contact;

a transmitter/receiver for said token communication signal;

a database to link said token to an individual's record containing a unique hand position template;

a software processing program to verify the token is valid;

an imaging device for producing image signals of a person's hand;

a minutia generator connected to said imaging device for receiving said image of a person's hand based on measurable biometrics characteristics of said hand image's comprising at least one of: (i) finger dimensions, (ii) palm dimensions, (iii) location of visible features on hand, (iv) location of thermal features of the hand, and (v) entire hand;

a software process program to convert the minutia into a unique hand position template using a mathematical relationship between said minutia points;

a unique hand position template match system that compares and computes a percentage of match between said image unique hand position template to unique hand position template from said database and produces a signal when the match percentage exceeds a set threshold or a different signal when the match does not exceed the set threshold.

7. The system as defined in claim 6 for authenticating an individual through an image of a person's unique hand position wherein said unique hand position is replaced with another biometric selected from the list of a face, arm, ear, head, or second hand.

8. The system as defined in claim 6, wherein several hand signal are stored in a reference database with each hand signal corresponding to a specific meaning.

9. The system as defined in claim 6, wherein said physical token is a contactless token.

10. The system as defined in claim 6, wherein said imaging device is an infrared camera.

11. The system as defined in claim 6, wherein said database includes access authorization information.

12. A method for authenticating or identifying an individual through the image of a person's hand comprising:

presenting a token to queue a file for hand recognition identification;

presenting a hand contactlessly to an imaging device;

acquiring and capturing image of said hand;

processing said image to isolate said hand image from its background;

processing said hand image to produce minutia points;

computing a livescan biometric template from distances, dimensions, ratios, and vectors from said minutia;

comparing said live scan biometric template with reference templates stored in a database;

computing a matching score based on matching algorithms that compare said referenced biometric templates to the said live scan biometric template;

determining a biometric match or non-match based on said matching algorithms score and matching criteria; and presenting said biometric match or non-match result via an output device.

13. The method of claim 12 wherein said physical token electronic input is provided from a contactless token.

14. The method for authenticating or identifying an individual through an image of a person's hand through a unique hand position comprising:

presenting a token to queue an a file for hand recognition identification;

contactlessly presenting said hand in a unique hand position selected from the list of: hand orientation, finger position, hand angle, and selected fingers extended or closed;

acquiring and capturing an image of said unique hand position;

processing said image to isolate said unique hand position from its background;

processing said unique hand position to reduce it to minutia points;

computing a livescan unique hand position template from distances, dimensions, ratios, and vectors from said minutia;

comparing said livescan unique hand position template with reference template stored in a database;

computing a matching score based on matching algorithms that compare referenced templates to said live scan unique hand position;

determining a biometric match or non-match based on said matching algorithms score and matching criteria; and presenting said livescan unique hand position match or non-match via an output device.

15. The method of claim 14 for authenticating or identifying an individual through an image of a person's unique hand position wherein said unique hand position is replaced or augmented with another body part selected from the list of a face, arm, ear, head, or second hand.

16. The method of claim 14 wherein comparing said livescan unique hand position template with reference template stored in a database is expanded to compare to several stored reference templates whereby each reference template has a unique meaning.

17. The system as defined by claim 1 wherein said unique hand position matching results in multiple unique verifications with different meanings selected from the list of access permitted, further action required, distress call, priority of user, number of persons in party, and other messages.

18. The system as defined by claim 1 wherein said token is the person's face or other biometric.

19. The system as defined by claim 12 wherein said token is the person's face or other biometric.

* * * * *